United States Patent [19]

Tanaka

[11] Patent Number: 5,052,759
[45] Date of Patent: Oct. 1, 1991

[54] MECHANICAL COMPONENT AND HYDRAULIC PRESSURE CONTROL VALVE INCLUDING THE MECHANICAL COMPONENT

[75] Inventor: Ryuichi Tanaka, Yokosuka, Japan

[73] Assignee: Nippon Air Brake Co., Ltd., Hyogo, Japan

[21] Appl. No.: 412,280

[22] Filed: Sep. 25, 1989

[30] Foreign Application Priority Data

Oct. 24, 1988 [JP] Japan ................. 63-267898

[51] Int. Cl.$^5$ .................................. F16K 51/00
[52] U.S. Cl. ........................... 303/9.62; 251/337
[58] Field of Search .............. 251/337; 267/161, 164; 303/9.62, 9.63, 9.71–9.75; 403/326, 367; 411/352, 353, 516, 517, 520, 521

[56] References Cited

U.S. PATENT DOCUMENTS

| | | | |
|---|---|---|---|
| 2,401,856 | 6/1946 | Brock | 251/337 X |
| 3,007,726 | 11/1961 | Parkin | 411/516 X |
| 3,359,021 | 12/1967 | Wurzel et al. | 411/517 X |
| 3,483,888 | 12/1969 | Wurzel | 267/161 X |
| 4,426,117 | 1/1984 | Burgdorf et al. | 303/9.73 |
| 4,640,554 | 2/1987 | Barr | 303/9.75 |
| 4,669,268 | 6/1987 | Takeuchi et al. | 303/9.75 X |
| 4,774,809 | 10/1988 | Hayashida et al. | 303/9.75 X |
| 4,893,878 | 1/1990 | Cole et al. | 303/9.75 |

FOREIGN PATENT DOCUMENTS

2127508  4/1984  United Kingdom .

*Primary Examiner*—Robert J. Oberleitner
*Assistant Examiner*—Alfred Muratori
*Attorney, Agent, or Firm*—Kane Dalsimer Sullivan Kurucz Levy Eisele and Richard

[57] ABSTRACT

In a mechanical component, a component body includes an opening, a first bore located at the opening and having a diameter of $D_1$, and a second bore located on the opposite side of the first bore from the opening and having a diameter of $D_2$, where $D_1$ is larger than $D_2$. A step is formed through which the first and second bores are connected to each other. An annular dish-shaped plate is urged against the step of the component body until the dish-shaped plate is deformed into a planar-plate configuration, to bite an outer periphery of the dish-shaped plate to a periphery of the first bore. Thus, an annular element formed by the dish-shaped plate is fixedly mounted to the component body. If the above-mentioned support structure is applied to a valve spring of a hydraulic pressure control valve, it is possible to surely stabilize the support of the valve spring.

13 Claims, 2 Drawing Sheets

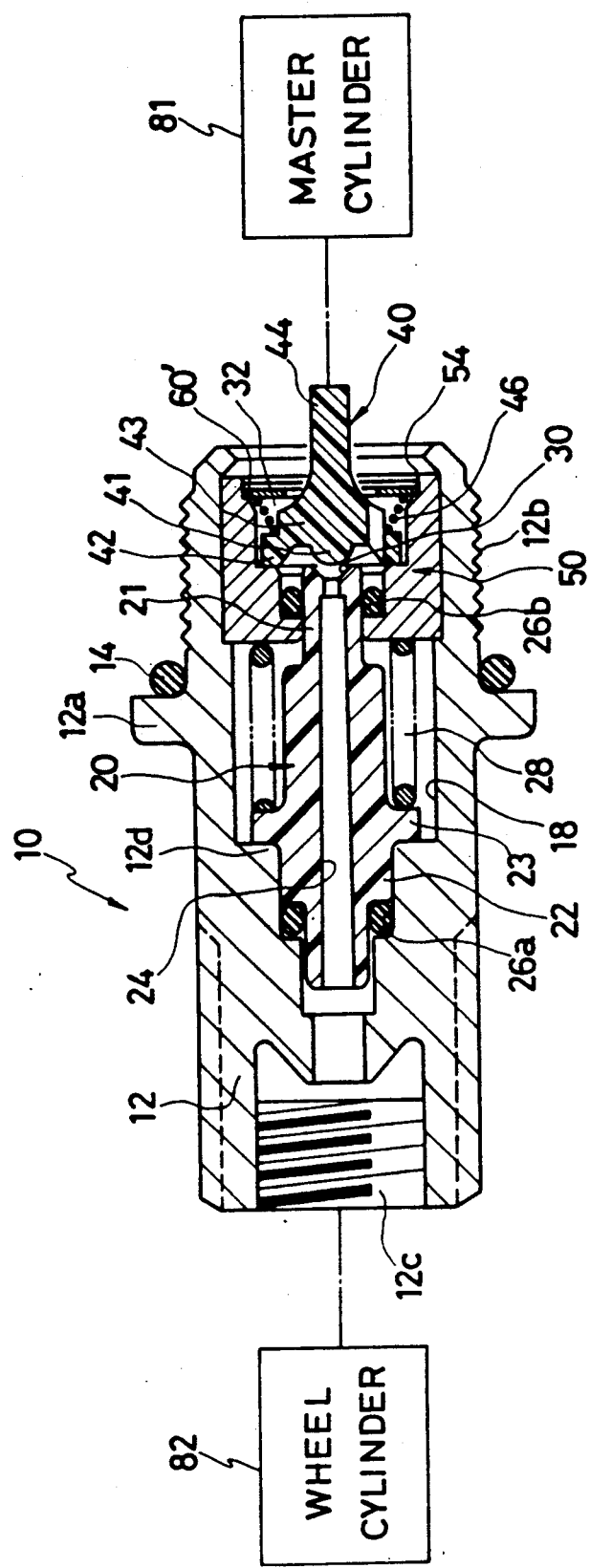
FIG. I

FIG. 2(A) FIG. 2(B) FIG. 2(C)
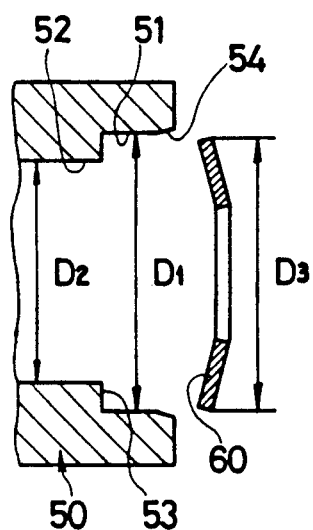 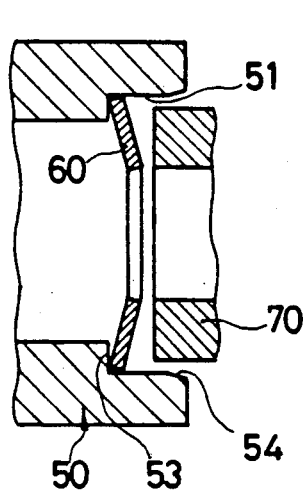 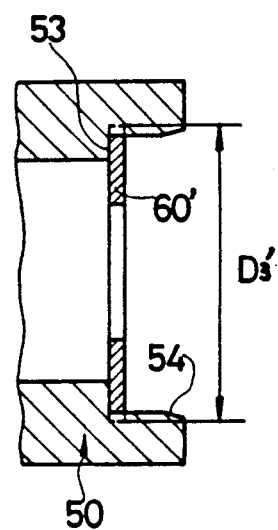
FIG. 3
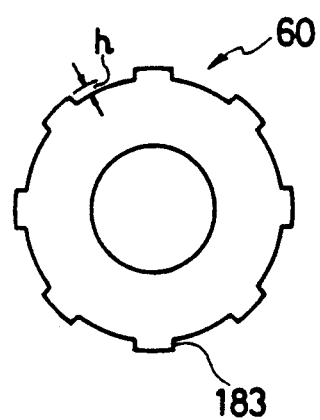
FIG. 4
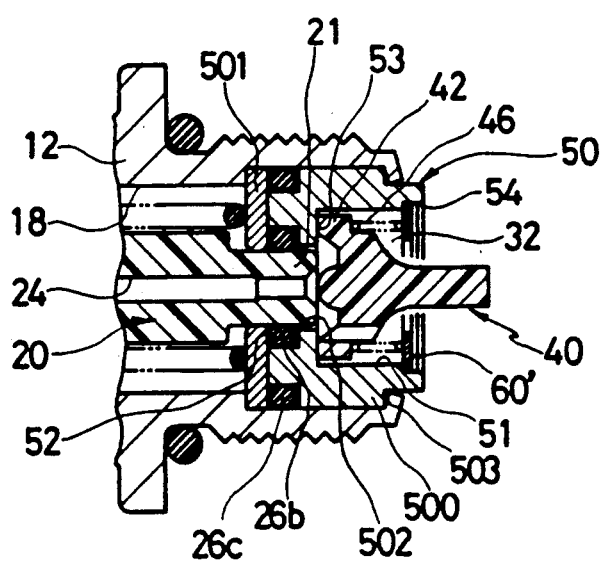

MECHANICAL COMPONENT AND HYDRAULIC PRESSURE CONTROL VALVE INCLUDING THE MECHANICAL COMPONENT

BACKGROUND OF THE INVENTION

The present invention relates to a technique suitable or effective for fixedly mounting an annular element to an opening of a component body and, more particularly, to a technique suitable for such mounting when the annular element is used as a stopper or a spring retainer in a valve component. Thus, the invention has remarkable advantages in utilization as, for example, a hydraulic pressure control valve which is used in a brake system of an automotive vehicle or the like.

Generally, there are many structures in which, in mechanical components, an annular member or element is fixedly mounted to an opening of a component body, or another component to be incorporated in the component body which has an end which is fixedly mounted to an inner periphery of the opening. The annular element at the opening serves as a spring retainer, a stopper or the like for preventing the component to be inserted in the component body from coming out of the latter, for example.

Conventionally, and as a well known technique in which an annular element or another internal component is fixedly mounted to the opening of the component body, an annular groove is formed in the inner periphery of the opening, and the annular element such as a C-shaped ring or the like or an end of the internal component is fitted in the annular groove. For instance, EP Patent Publication No. 0 157 158 A2 or GB Patent Application No. 2 195 408A discloses a hydraulic pressure control valve in which an annular groove is formed in an inner periphery of an opening in a valve body. The valve body is adapted to be threadedly engaged with a portion of a brake master cylinder, and faces toward a hydraulic chamber of the brake master cylinder, and an end of a valve spring is fitted in the groove and is supported at the opening.

With the conventional technique described above, first, considerable time is taken since the annular groove must be processed at the inner periphery of the opening and, moreover, an annular element or another internal component must be fitted in the groove. Secondly, because the annular element or another internal component is fitted merely in the groove, the support of the annular element or another component is unsteady.

For instance, the hydraulic pressure control valve disclosed in the aforesaid EP Patent Publication No. 0 157 158 A2 or GB Patent Application No. 2 195 408A will be considered with reference to the unsteadiness of the support of the annular element. Generally, the hydraulic pressure control valve is arranged at a portion of a tandem master cylinder, which communicates with a wheel cylinder for rear wheels. When a failure occurs in a brake circuit for front wheels, a control function of the control valve is released. In case of a failure, a follower piston of the tandem master cylinder moves excessively or violently to incline a poppet valve element of the hydraulic pressure control valve, thereby releasing the pressure regulating function. Accordingly, since biased or one-sided force is applied to a valve spring which urges the poppet valve element, it is important to ensure the support of the valve spring. In this respect, it is impossible for the conventional technique to sufficiently respond to insure the stability or steadiness of the support of the valve spring.

SUMMARY OF THE INVENTION

It is therefore an object of the invention to provide a technique capable of offering a stable support structure, while reducing time of processing and mounting.

For such purposes, according to the invention, there is provided a mechanical component comprising:

a component body including an opening, a first bore located at the opening and having a diameter of $D_1$, a second bore located on the opposite side of the first bore from the opening and having a diameter of $D_2$, where $D_1$ is larger than $D_2$, and a step through which the first and second bores are connected to each other; and an annular element fixedly mounted to the component body in such a manner that an annular dish-shaped plate forming the annular element is urged against the step of the component body until the dish-shaped plate is deformed into a planar-plate configuration, to force into engagement with and bite an outer periphery of the dish-shaped plate to a periphery of the first bore.

According to the invention, there is also provided a hydraulic pressure control valve for use with a master cylinder and a wheel cylinder, comprising:

a valve body formed therein with a stepped bore;

a piston inserted in the stepped bore for sliding movement therealong;

an inlet chamber defined in the valve body on the side of one end of the piston and capable of communicating with the master cylinder;

an outlet chamber defined in the valve body on the side of the other end of the piston and capable of communicating with the wheel cylinder;

passage means formed in the piston, the inlet and outlet chambers communicating with each other through the passage means;

a valve element arranged in facing relation to an end of the passage means which is located in facing relation to the inlet chamber;

valve spring means for biasing the valve element toward a predetermined position located at the end of the passage means;

the valve body including, adjacent the inlet chamber, an opening, a first bore located at the opening and having a diameter of $D_1$, a second bore located on the opposite side of the first bore from the opening and having a diameter of $D_2$, where $D_1$ is larger than $D_2$, and a step through which the first and second bores are connected to each other; and an annular element is fixedly mounted to the valve body in such a manner that an annular dish-shaped plate forming the annular element is urged against the step of the valve body until the dish-shaped plate is deformed into a planar-plate configuration, to force into engagement with and bite an outer periphery of the dish-shaped plate to a periphery of the first bore, the annular element serving as a spring retainer for supporting an end of the valve spring means which is remote from the one end of the piston.

With the arrangement described above, the dish-shaped plate has its outer peripheral dimension which increases more than the diameter $D_1$ of the first bore when the dish-shaped plate is urged against the step until the dish-shaped plate is deformed into the planar-plate configuration. Thus, the annular element in the form of the planar-plate configuration is firmly supported by the periphery of the component body.

Accordingly, when the above-mentioned support structure is applied to the valve spring of the hydraulic pressure control valve, it is possible to surely stabilize the support of the valve spring.

Thus, according to the invention, time of processing and mounting can be reduced, and the support can be stabilized.

BRIEF DESCRIPTION OF THE DRAWINGS

FIG. 1 is a longitudinal cross-sectional view of a hydraulic pressure control valve according to an embodiment of the invention;

FIGS. 2(A) through 2(C) are fragmentary views showing a support structure for an annular element;

FIG. 3 is a front elevational view of a modification of a dish-shaped plate forming the annular element; and FIG. 4 is a fragmentary view of another embodiment of the invention.

DETAILED DESCRIPTION

Referring to FIG. 1, there is shown a hydraulic pressure control valve, generally designated by the reference numeral 10, according to an embodiment of the invention. The hydraulic pressure control valve 10 comprises a valve body 12 which is made of metal and which has a flange 12a between the ends of the valve body 12. One end of the valve body 12 is provided with male threads 12b for mounting to a discharge section of a master cylinder 81. Further, the other end of the valve body 12 is formed with a pipe-mounting section or an outlet chamber 12c for connection to a wheel cylinder 82 of a brake device. An O-ring seal 14 located adjacent the right-hand end face of the flange 12a and about the outer periphery of the valve body 12 serves to maintain sealing between the master cylinder 81 and the valve body 12.

The valve body 12 is provided therein with a bore 18 which extends from the end of the valve body 12 located at an inlet chamber 32. The bore 18 extends to the other end of the valve body 12, at which the outlet chamber 12c is located. The bore 18 is a stepped bore, and a stepped piston 20 is inserted in the bore 18 for sliding movement therealong. The piston 20 has, at one end, a smaller-diameter portion 21 and, adjacent its other end, a larger-diameter portion 22. The piston 20 further has a flange 23 between the smaller-diameter and larger-diameter portions 21 and 22. The piston 20 is provided therein with a through bore or a passage 24 extending between ends of the piston 20. The passage 24 causes the inlet chamber 32 and the outlet chamber 12c to communicate with each other. A pair of O-ring seals 26a and 26b at the respective larger-diameter and smaller-diameter portions 22 and 21 prescribe or regulate pressure-receiving areas at the respective opposite ends of the piston 20. At the stage in which hydraulic pressure discharged from the master cylinder 81 is low, the piston 20 under the bias of a preload spring 28 is shifted, and the flange 23 between the ends of the piston 20 is abutted against a step 12d of the valve body 12, so that the piston 20 is held stationary in this position.

The passage 24 extending centrally through the piston 20 has an opening at which a valve seat 30 is arranged. The valve seat 30 faces toward the inlet chamber 32 at the corresponding opening of the valve body 12. A poppet valve element 40 made of plastic is accommodated in the inlet chamber 32. When the hydraulic pressure reaches a predetermined value, the force acting upon the differential surface area between the larger-diameter and smaller-diameter portions 22 and 21 overcomes the biasing force of the preload spring 28, so that the piston 20 moves toward the inlet chamber 32. By this movement, the poppet valve element 40 is seated on the valve seat 30. Thus, the known hydraulic control is effected. Here, the piston 20 is made of material such as, for example, plastic which has a certain elasticity or resiliency. Accordingly, when the piston 20 moves violently so as to be abutted against the metallic valve body 12, no abnormal or foreign sound occurs which causes anxiety. Thus, there is no need to form a restriction which reduces the area of the passage 24 for hydraulic fluid, in order to prevent the piston 20 from being returned violently.

The poppet valve element 40 is a molded article made of plastic, and has a semi-circular valve section 41 at a left-hand end and an annular leg 42 surrounding the valve section 41. The leg 42 and the valve section 41 are integrated by a trunk section 43. A head section or an engaging section 44 having a small diameter is arranged adjacent the trunk section 43. The head section 44 projects considerably outwardly from the opening of the valve body 12. The head section 44 of the poppet valve element 40 engages a flange or the like of a piston within the master cylinder 81 when the piston within the master cylinder 81 moves violently due to some malfunction, to release the hydraulic pressure control action of the hydraulic pressure control valve 10.

The poppet valve element 40 is urged against the valve seat 30 under biasing force of a valve spring 46. The valve body 12 is of one-piece structure, and a component body 50 is fixedly mounted to the valve body 12 fitting it in the inlet chamber 32 and an end face of the component body 50 is caulked to the corresponding end of the valve body 12. The valve spring 46 has one end thereof which is supported by the poppet valve element 40. The other end of the valve spring 46 is supported by an annular or circular element 60' which is located at an opening 54 of the component body 50. The component body 50 is made of free cutting carbon steel (JIS: SUM 24L), while the annular element 60' is made of cold rolled carbon steel (JIS: SPCC). However, the annular element 60' may be made of material identical with that of the component body 50.

A structure for mounting or supporting of the annular element 60' will be apparent from FIGS. 2(A) through 2(C). The component body 50 includes, in addition to the opening 54, a first bore 51 located at the opening 54 and having a diameter of $D_1$, and a second bore 52 located on the opposite side of the first bore 51 from the opening 54 and having a diameter of $D_2$, where $D_1$ is larger than $D_2$. The component body 50 is annular in shape and is provided at its one end with the opening 54. The opening 54 and the first and second bores 51 and 52 are in concentric relation to an outer periphery of the component body 50. The opening 54, the first bore 51 and the second bore 52 are located in coaxial relation to each other. A step 53 is formed through which the first and second bores 51 and 52 are connected to each other. The step 53 extends substantially perpendicularly to an axis of the component body 50.

As illustrated in FIG. 2(A), an annular or circular dish-shaped plate 60 having its outer peripheral dimension or outer diameter $D_3$ equal to or slightly less than the diameter $D_1$ at freedom is inserted into the first bore 51 in the component body 50. Subsequently, as shown in FIG. 2(B), the annular dish-shaped plate 60 is urged against the step 53 of the component body 50 by a tubular press tool 70 until the dish-shaped plate 60 is deformed into a planar-plate configuration. As illustrated in FIG. 2(C), when the dish-shaped plate 60 is deformed into the planar and annular element 60′, the diameter $D_3′$ of the annular element 60′ increases to a value larger than the diameter $D_1$ of the first bore 51, so that the outer peripheral portion of the annular element 60′ is forced into engagement with and partially bitten to the inner wall of the first bore 51. Thus, the annular element 60′ serviing as a spring retainer for the end of the valve spring 46, is firmly and fixedly mounted to the component body 50.

In connection with the above, the dish-shaped plate 60 may be provided at its periphery with a plurality of cut-outs 183, as shown in FIG. 3. In this case, the height h of each cut-out 183 or each projection may be such that, when the dish-shaped plate 60 is deformed into the annular element 60′ after force-fitting, all of the projections are forced into engagement with and bitten to the periphery of the first bore 51. In this connection, the projections may be semi-circular in shape.

In the illustrated embodiment, the head section 44 of the poppet valve element 40, which is remote from the end of the passage 24, projects considerably outwardly from the opening of the valve body 12, in order to release the pressure regulating action of the control valve 10 when a failure occurs. However, it is possible to dispense the projected head section 44 if such a failure countermeasure is not required.

FIG. 4 fragmentarily illustrates a hydraulic pressure control valve according to another embodiment of the invention. In FIG. 4, components and parts like or similar to those shown in FIG. 1 are designated by the same or like reference numerals, and the description of such like or similar components and parts will be omitted to avoid repetition.

In the embodiment illustrated in FIG. 4, a component body 50 is composed of a poppet casing portion 500 and a ring portion 501 serving as a spring retainer. The poppet casing portion 500 has first and second bores 51 and 52 which are connected to each other through a third bore 502. The first through third bores 51, 52 and 502 are arranged in coaxial relation to each other and in concentric relation to the outer periphery of the component body 50. The third bore 502 has its diameter slightly larger than the diameter of an end of the piston 20, which is received in the third bore 502. The component body 50 has an inner peripheral groove defined by the outer periphery of the smaller-diameter portion 21 of the stepped piston 20, the ring portion 501 and an end of the poppet casing portion 500 remote from the opening 54. The O-ring seal 26b is received in the inner peripheral groove of the component body 50. An O-ring seal 26c is additionally provided in concentric relation to the O-ring seal 26b which is arranged about the outer periphery of the smaller-diameter end 21 of the stepped piston 20. The O-ring seal 26c seals between the periphery of the stepped bore 18 in the valve body 12 and the outer peripheral surface of the poppet casing portion 500. The poppet casing portion 500 has, at its outer periphery, a step 503 to which the end of the valve body 12 adjacent the opening 54 is caulked.

The embodiment shown in FIG. 4 is effective in prevention of the O-ring seal 26b around the smaller-diameter portion 21 of the stepped piston 20, from coming out of an annular groove defined by the second bore 52 and the smaller-diameter portion 21. That is, in the embodiment illustrated in FIG. 1, there are fears that the O-ring seal 26b comes out toward the inlet chamber 32, and the leg 42 of the poppet valve element 40 gets into the groove defined by the second bore 52 and the smaller-diameter portion 21. The embodiment shown in FIG. 4 can effectively prevent such fears.

The invention is applicable to a wide area as a technique in which an annular element is fixedly mounted to an inner periphery of an opening.

What is claimed is:

1. A hydraulic control valve for use with a master cylinder and a wheel cylinder, comprising:
    a valve body formed therein with a stepped bore:
    a piston inserted in said stepped bore for sliding movement therealong;
    an inlet chamber defined in said valve body on a first side of one end of said piston and capable of communicating with said master cylinder;
    an outlet chamber defined in said valve body on a second side of a second end of said piston and capable of communicating with said wheel cylinder;
    passage means formed in said piston, said inlet and outlet chambers communicating with each other through said passage means;
    a valve element arranged in facing relation to an end of said passage means which is located in facing relation to said inlet chamber;
    valve spring means for biasing said valve element toward a predetermined position located at the end of said passage means;
    said valve body including, adjacent said inlet chamber, an opening, a first bore having a first side located at said opening and an opposite side and having a diameter of $D_1$, a second bore located on the opposite side of said first bore from said opening and having a diameter of $D_2$, where $D_1$ is larger than $D_2$, and a step through which said first and second bores are connected to each other; and
    an annular element fixedly mounted to said valve body in such a manner that an annular dish-shaped plate forming said annular element is urged against said step of said valve body until said dish-shaped plate is deformed into a planar-plate configuration, to bit an outer periphery of said dish-shaped plate to a periphery of said first bore, said annular plate having a free outer diameter $D_3$ which is less than diameter $D_1$ of the first bore and that of said opening prior to mounting to said valve body, the outer peripheral portion of the annular plate being inclined in the same direction as that in which the plate is urged during its mounting, said annular element serving as a spring retainer for supporting an end of said valve spring means which is remote from the one end of said piston with a second end of the spring being biased against the valve element.

2. A hydraulic pressure control valve according to claim 1, wherein said valve body is made of metal, and said piston is made of material having an elasticity.

3. A hydraulic pressure control valve according to claim 2, wherein said material of which said piston is made is plastic.

4. A hydraulic pressure control valve according to claim 2, wherein said valve body is of one-piece structure.

5. A hydraulic pressure control valve according to claim 1, wherein a component body is fixedly mounted to said valve body and is provided therein with said opening and said first and second bores.

6. A hydraulic pressure control valve according to claim 5, wherein said component body is caulked to said valve body.

7. A hydraulic pressure control valve according to claim 5, wherein said component body is annular in shape and is provided at its one end with said opening, said opening and said first and second bores being in concentric relation to an outer periphery of said component body.

8. A hydraulic pressure control valve according to claim 1, wherein said step extends substantially perpendicularly to an axis of said valve body.

9. A hydraulic pressure control valve according to claim 1, wherein said opening, said first bore and said second bore are located in coaxial relation to each other.

10. A hydraulic pressure control valve according to claim 1, wherein said dish-shaped plate has its diameter at least equal to said diameter $D_1$ of said first bore.

11. A hydraulic pressure control valve according to claim 1, wherein said dish-shaped plate is provided at its periphery with a plurality of cut-outs.

12. A hydraulic pressure control valve according to claim 5, wherein said dish-shaped plate is made of material different from that of which said component body is made.

13. A hydraulic pressure control valve according to claim 1 wherein the annular element has a central hole and the valve element has a head section projecting through said hole and out of the inlet chamber.

* * * * *